July 17, 1956 L. E. BYLKAS 2,754,587
TART DOUGH CUTTER
Filed April 16, 1954
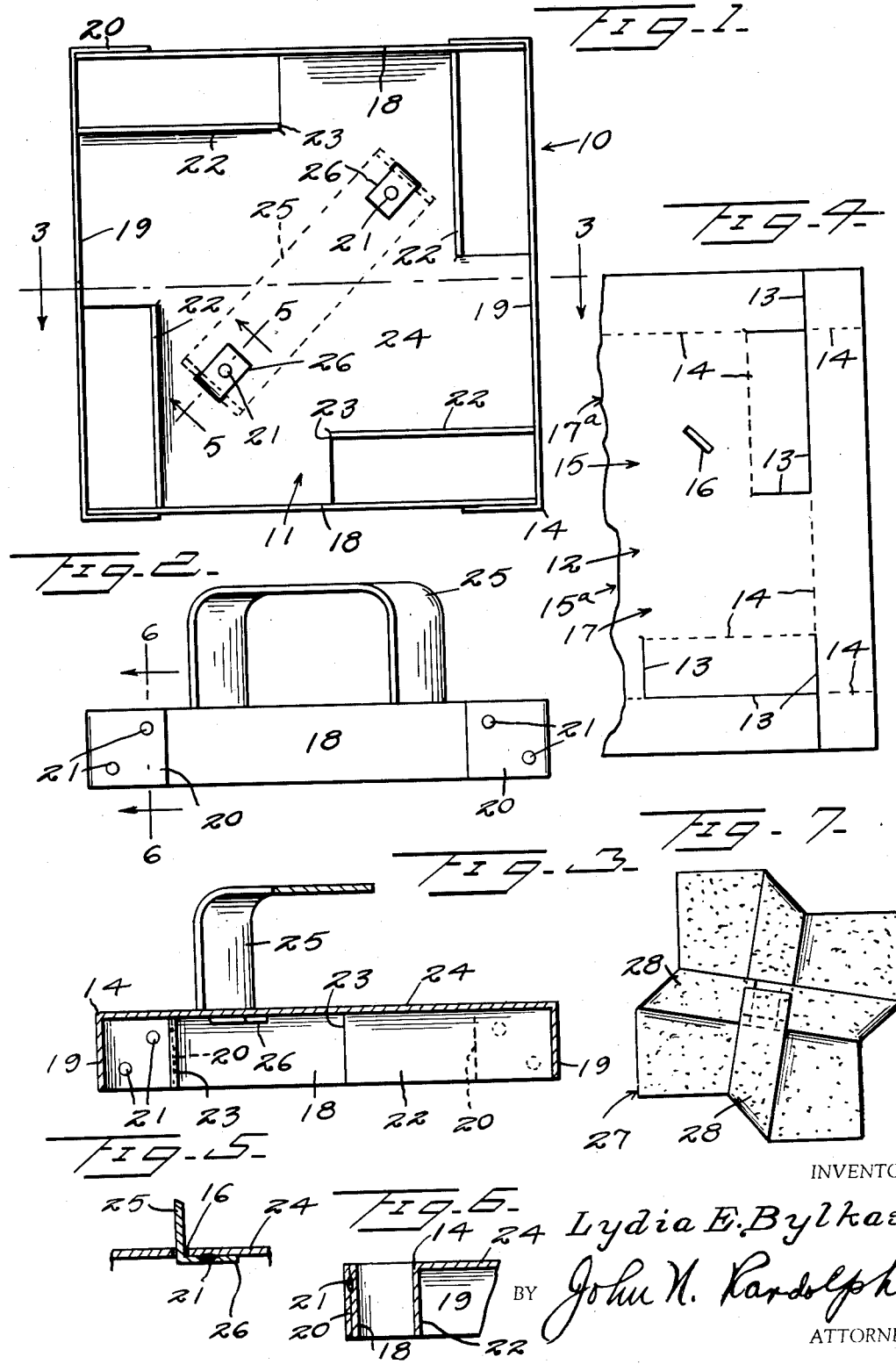
INVENTOR
Lydia E. Bylkas
BY John N. Randolph
ATTORNEY

United States Patent Office 2,754,587
Patented July 17, 1956

2,754,587

TART DOUGH CUTTER

Lydia E. Bylkas, Lake Linden, Mich.

Application April 16, 1954, Serial No. 423,747

3 Claims. (Cl. 30—301)

This invention relates to a novel construction of cutter for cutting dough to be used in forming tarts and has for its primary object to provide a dough cutter of extremely simple construction whereby pieces of dough may be cut from a rolled sheet of dough and simultaneously sliced to provide strips, each secured along an inner end only thereof to the remainder of the piece of dough and which strips are adapted to be folded inwardly and to cooperate with one another and with the remainder of the piece separated by the cutter to secure a tart filling in place between the strips and the body portion of the cut dough piece.

Another object of the invention is to provide a dough cutter of the aforedescribed character which may be very economically manufactured and sold yet which will be extremely efficient and durable for accomplishing its intended result and by the use of which tarts of uniform sizes and shapes may be readily prepared.

Various other objects and advantages of the invention will hereinafter become more fully apparent from the following description of the drawing, illustrating a presently preferred embodiment thereof, and wherein:

Figure 1 is a bottom plan view of the tart cutter;

Figure 2 is a side elevational view thereof;

Figure 3 is a cross sectional view taken subsantially along a plane as indicated by the line 3—3 of Figure 1;

Figure 4 is a fragmentary plan view of a portion of the blank from which the body portion of the cutter is formed;

Figure 5 is an enlarged sectional view taken substantially along a plane as indicated by the line 5—5 of Figure 1;

Figure 6 is a fragmentary sectional view taken substantially along a plane as indicated by the line 6—6 of Figure 2, and Figure 7 is a plan view of a strip-like piece of dough cut by the cutter and with the strips folded in to form the body of a tart.

Referring more specifically to the drawing, for the purpose of illustrating one form of the invention, a tart cutter, designated generally 10 is illustrated. The tart cutter 10 as illustrated is formed of sheet metal, such as aluminum, but as the description proceeds it will become readily apparent that the tart cutter can be formed of other materials. For example, the tart cutter is readily adapted to be molded from plastic.

In the form of the cutter 10 as illustrated in the drawing, said cutter includes a body portion, designated generally 11, formed from a single sheet of material 12. Approximately one-half of the sheet or blank 12 from which the body 11 is formed is shown in Figure 4. Each of the four corners of the sheet 12, only two of which are shown, is cut along the solid lines as seen at 13 and is bent along the dotted lines as seen at 14 in Figure 4. One of the fully illustrated corners, designated generally 15, is provided with an elongated opening or slot 16 while the other fully illustrated corner 17 is not provided with such a slot. The corner 15a, which is broken away, corresponds with the corner 15 and is disposed diagonally opposite thereto. The other broken away corner 17a corresponds with and is disposed diagonally opposite to the corner 17.

The sheet 12 is bent along fold lines 14 which are disposed parallel to its edges to form the four depending flanges 18 and 19 which are of uniform width. The flanges 19 are longer than the flanges 18 and the end portions 20 thereof are folded inwardly against the outer sides of the end portions of the flanges 18, as clearly illustrated in Figures 1, 2 and 6, and are secured thereto in any suitable manner as by spot welding, as seen at 21 or by soldering or otherwise. The sheet 12 is then bent along the remaining fold lines 14, which are spaced inwardly from the fold lines forming the flanges 18 and 19, to form the depending inner flanges or walls 22. Each flange or wall 22 abuts at an outer end thereof against the inner side of a flange 18 or 19 and is disposed inwardly spaced from and substantially parallel to another adjacently disposed flange 18 or 19. The inner flanges or walls 22 are substantially shorter than the outer flanges 18 and 19 and have inner ends 23 spaced from an adjacent inner flange 22. The flanges 22 at diagonally opposite corners of the body portion 11 are disposed parallel to one another. The remainder of the blank 12 constitutes the top 24 of the body portion 11 in which the openings or slots 16 are formed.

The cutter 10 also includes a bail like handle 25, formed from a single strip of metal which is substantially U-shaped or arch shaped, as seen in Figure 2, and which has end portions 26 of reduced width relatively to the remainder of the handle 25. Said end portions 26 are of a width to extend downwardly through the openings 16 and are bent inwardly and upwardly and secured to the underside of the top wall 24 in any suitable manner as by welding, as indicated at 21.

Assuming that a mass of dough, not shown, has been rolled out in a conventional manner to a relatively thin sheet, said sheet of dough is cut by means of the cutter 10 which is grasped in either hand by the handle 25. With the cutter 10 thus held, the body portion 11 is displaced downwardly against a portion of the sheet of dough so that the bottom edges of the flanges 19 and 18 will cut out a sheet segment of the dough. The body portion 11 is shown as being square so that a sheet portion cut out thereby will be square in shaped. Simultaneously with this cutting operation by which a segment of the sheet is separated, the bottom edges of the inner flanges or walls 22, which are disposed coplanar with the bottom edges of the outer flanges 18 and 19, cut the separated sheet segment to form four elongated strips which are secured to the remainder of the sheet segment only at their inner ends. Such a dough sheet segment is illustrated in Figure 7 at 27 having the four elongated strips 28, which are thus formed simultaneously with the forming of the dough sheet segment 27. Strips 28 are shown in Figure 7 folded over the top of the remainder of the sheet segment 27 and having their ends overlapped and joined above the center of the sheet segment 27. Said strips 28 may be stretched somewhat in assuming their positions of Figure 7 or if desired the strips 28 may be made longer by merely increasing the length of the inner flanges 22.

As previously stated, it will be readily apparent that the body portion 11 could be very easily and inexpensively formed of molded plastic and the handle 25 could likewise be formed of plastic or of any other suitable material.

It will be obvious that the body portion 11 may be of various sizes and may be made rectangular rather than square.

Various other modifications and changes are contemplated and may obviously be resorted to, without departing from the spirit or scope of the invention as hereinafter defined by the appended claims.

I claim as my invention:

1. A dough cutter of the character described comprising a body portion including a top wall having depending outer flanges extending along the edges thereof, said top wall being provided with a plurality of inner flanges depending therefrom and corresponding in number to the outer flanges, each of said inner flanges being substantially straight and having an outer end abutting against the inner side of one of said outer flanges and an inner end spaced from an adjacent inner flange, each of said inner flanges being spaced inwardly from and disposed substantially parallel to another adjacent one of said outer flanges, and said outer flanges and inner flanges having bottom edges disposed coplanar with one another.

2. A dough cutter as in claim 1, said outer and inner flanges depending from a lower side of the top wall, and a handle formed from a relatively wide strip of metal secured to and extending upwardly from said top wall, said handle being bail shaped and being disposed diagonally of the body portion and having restricted end portions extending through the top wall and secured thereto.

3. A dough cutter as in claim 1, said body portion being substantially square, said inner flanges being disposed adjacent the corners of the body portion, and the inner flanges disposed at diagonally opposite corners of said body portion being disposed substantially parallel to one another and substantially at right angles to the remaining inner flanges.

References Cited in the file of this patent

UNITED STATES PATENTS

| | | |
|---|---|---|
| D. 161,919 | Gorko | Feb. 13, 1951 |
| 1,800,315 | Olson et al. | Apr. 14, 1931 |
| 2,089,396 | Meilstrup | Aug. 10, 1937 |